(12) United States Patent
Niklas et al.

(10) Patent No.: US 7,762,129 B2
(45) Date of Patent: Jul. 27, 2010

(54) TIRE TREAD DETECTION AND MEASUREMENT OF PHYSICAL VARIABLES OF A TIRE ON A MOVING VEHICLE

(75) Inventors: Alfred Niklas, Poing (DE); Dirk Hammerschmidt, Villach (AT)

(73) Assignee: Infineon Technologies AG, Munich (DE)

( * ) Notice: Subject to any disclaimer, the term of this patent is extended or adjusted under 35 U.S.C. 154(b) by 281 days.

(21) Appl. No.: 11/860,948

(22) Filed: Sep. 25, 2007

(65) Prior Publication Data
US 2009/0078347 A1    Mar. 26, 2009

(51) Int. Cl.
*B60C 23/02* (2006.01)
(52) U.S. Cl. ............................. 73/146.5; 73/8
(58) Field of Classification Search ................... 73/146, 73/8; 152/154.2
See application file for complete search history.

(56) References Cited

U.S. PATENT DOCUMENTS

| 7,051,584 | B2 | 5/2006 | Robert et al. |
| 7,119,896 | B2 | 10/2006 | Godeau et al. |
| 7,204,135 | B2 | 4/2007 | Robert |
| 7,578,180 | B2 * | 8/2009 | Lionetti et al. ................ 73/146 |
| 2007/0035386 | A1 * | 2/2007 | Pullini et al. ................ 340/442 |
| 2007/0175555 | A1 * | 8/2007 | Myatt ...................... 152/152.1 |
| 2009/0000370 | A1 * | 1/2009 | Lionetti et al. ................ 73/146 |

* cited by examiner

*Primary Examiner*—Andre J Allen
(74) *Attorney, Agent, or Firm*—Eschweller & Associates, LLC

(57) ABSTRACT

A tire tread sensing system includes a magnetic field sensor and a magnetic field source configured to magnetize magnetizable particles embedded in a tire tread. The magnetic field sensor is configured to measure a magnetic field strength associated with the magnetic field source and the magnetizable particles, and the magnetic field strength is indicative of a tire tread depth. Alternatively, the particles comprise alternating permanent magnets embedded in a tread portion of a tire.

19 Claims, 5 Drawing Sheets

TIRE TREAD DETECTION AND MEASUREMENT OF PHYSICAL VARIABLES OF A TIRE ON A MOVING VEHICLE

FIELD OF INVENTION

The present invention relates generally to magnetic field sensors, and more particularly to a system and method of use of magnetic field sensors in tire applications.

BACKGROUND OF THE INVENTION

Detecting tire tread wear or other tire characteristics is valuable in ensuring that tires used on vehicles are safe and in good operating condition. In the prior art, the measurement of tire tread wear required the vehicle to be at rest, thereby preventing a user from learning of a tire tread condition of import at the earliest opportune time. There is a need to provide improved tire tread and other characteristic sensing systems and methods that overcome the limitations of the prior art.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

In one embodiment, a tire tread sensing system is disclosed and comprises a magnetic field sensor and a magnetic field source configured to magnetize magnetizable particles embedded in a tire tread. The magnetic field sensor is configured to measure a magnetic field strength associated with the magnetic field source and the magnetizable particles, and the magnetic field strength is indicative of a tire tread depth.

In another embodiment, a tire tread sensing system is disclosed and comprises a magnetic field sensor and a plurality of permanent magnets configured to be embedded in a tire tread. The magnetic field sensor is configured to measure a magnetic field strength and/or a time-varying magnetic field associated with the permanent magnets, and the magnetic field strength is indicative of a tire tread depth and/or other tire characteristics.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
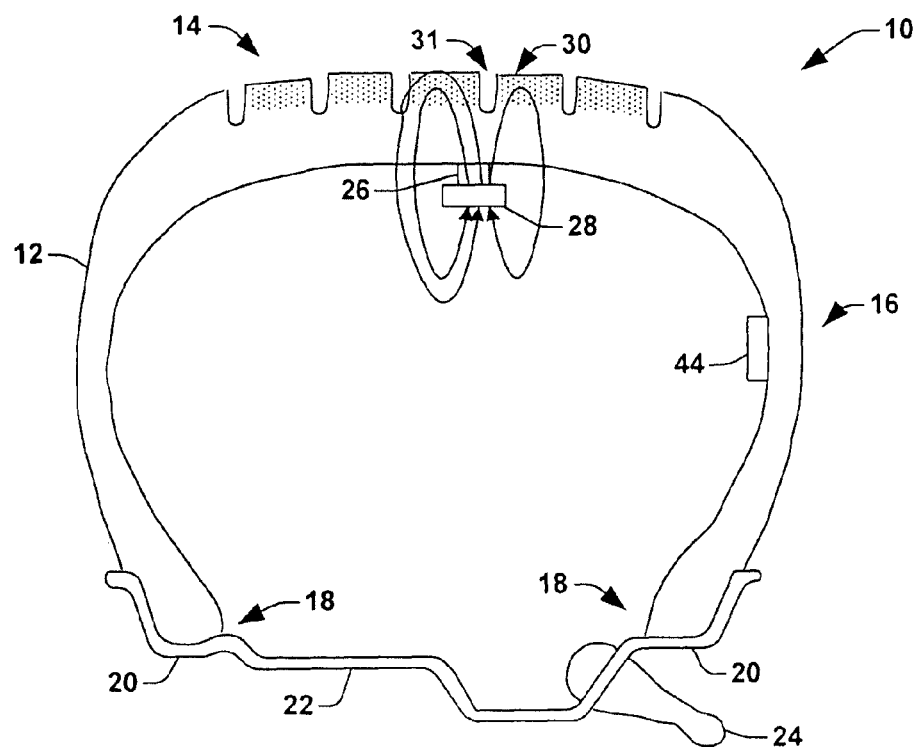
FIG. 1 is a cross section of a tire illustrating a tire tread sensing system according to one embodiment of the invention.

One or more implementations of the present invention will now be described with reference to the attached drawings, wherein like reference numerals are used to refer to like elements throughout. The invention relates to systems and methods for determining tire tread wear or other tire characteristics while the vehicle employing such tire is moving.

Turning now to FIG. 1, a tire tread sensing system 10 is disclosed. The system 10 is associated with a tire 12 having a tread portion 14 and sidewall portions 16, respectively. The sidewall portions 16, in one embodiment, terminate at an edge portion 18 that interfaces with a lip portion 20 of a wheel 22. The wheel 22 further includes a stem 24 that may be employed to adjust an inflation level, and thus a pressure, of the tire 12.

The tire tread sensing system 10 comprises a magnetic field sensor 26 operably associated with the tread portion 14 of the tire 12. In one embodiment, the sensor 26 is a Hall-effect sensor, or an anisotropic magnetoresistance (AMR) sensor, or a giant magnetoresistance (GMR) sensor. Alternatively, any type of magnetic field sensor may be employed, and all such alternatives are contemplated as falling within the scope of the invention. The system 10 further comprises a magnetic field source 28 operably associated with the tread portion 14 of the tire 12. In one embodiment the magnetic field source 28 comprises a permanent magnet in close enough physical proximity to the tire 12 to influence (magnetize) the particles in the tire 12. Alternatively, however, any form of magnetic field source may be employed and all such alternatives are contemplated as falling within the scope of the invention. While FIG. 1 illustrates the magnetic field sensor 26 and the magnetic field source 28 in physical contact and stacked, it should be understood that this illustrated embodiment is non-limiting, and any operable configuration may be employed.

The magnetic field source 28 provides a magnetic field that is operable to magnetize particles 30 that are embedded in the tread portion 14 of the tire 12. That is, the magnetic field source 28 is operable to influence the particles 30 embedded in the tire tread 14, which thus orient so as to contribute to the total magnetic field that is sensed by the magnetic field sensor 26. Therefore, although somewhat oversimplified, in one embodiment the total magnetic field $B_T$ sensed by the sensor 26 has a source component $B_1$ associated with the magnetic field source 28, and a tire tread component $B_2$ associated with the magnetized particles 30 embedded in the tire 12. As the tread portion 14 of the tire 12 experiences wear, some amount of the particles 30 release from the tire 12, and the tire tread field component $B_2$ decreases. Consequently, by monitoring a field strength $B_T$ at the magnetic field sensor 26, a tire tread condition may be ascertained while the tire 12 is in use, that is, while a vehicle employing the tire 12 is being driven.

In another embodiment of the invention, the magnetic field sensor 26 and magnetic field source 28 are located at a position with respect to a tire tread opening 31 that is asymmetric. That is, as illustrated in FIG. 1, the magnetizable particles in the tire reduce the magnetic resistance, and thus more magnetic flux exists where there are more magnetizable particles 30. By positioning the sensor 26 and the source 28 asymmetrically with respect to a tread opening 31, if the sensor 26 comprises a left sensor and a right sensor, each sensor senses a different amount of flux due to the asymmetrically positioning of the sensor 26, and thus a differential signal will exist therebetween. As the tire tread wears, fewer magnetizable particles exist to alter the flux variation between the two sensors, and the differential signal will decrease. In the above manner, the differential signal may be employed to ascertain an amount of tire tread wear.

Figure 2A:
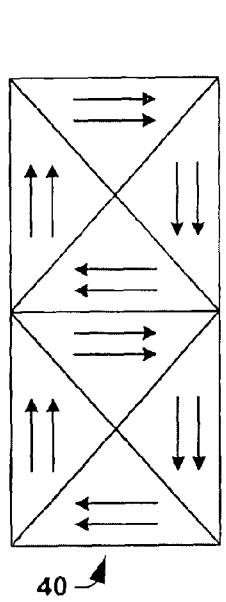
FIGS. 2A-2C show a ferromagnetic material under the influence of a magnetic field.
Figure 2B:
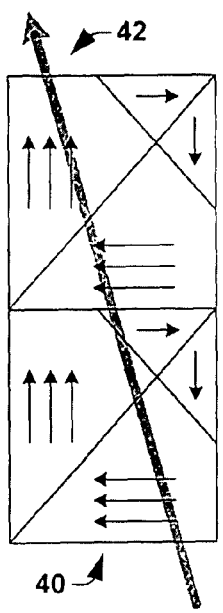
Figure 2C:
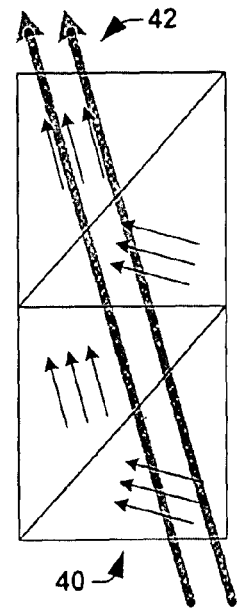

In one embodiment of the invention, the magnetizable particles 30 comprise ferroelectric particles. Ferroelectric particles are particles that have a magnetic dipole moment associated therewith. For example, as illustrated in FIG. 2A, ferroelectric particles 40 in the absence of a magnetic field have "Weiss" regions that are spontaneously magnetized, and there is an equilibrium of the magnetization in all directions. If a field is applied, as shown in a field 42 in FIG. 2B, the "Bloch" walls between the "Weiss" regions are shifted and a majority of the magnetization is aligned to the field direction. If the field 42 is further increased, as illustrated in FIG. 2C, the magnetization of the material further increases due to further alignment. Consequently, while such particles embedded within the tire tread of FIG. 1 will assume random orientations, and thus macroscopically provide no field contribution, upon being subjected to a magnetic field from the magnetic field source 28, the particles collectively align with respect to the field, and thus provide a collective tire tread component $B_2$.

In one embodiment the magnetizable particles 30 comprise ferroelectric particles, however, any type of particle that is magnetizable may be employed, and all such alternatives are contemplated as falling within the scope of the invention.

In one embodiment the tire tread sensing system 10 further comprises a controller 44 associated with the tire 12 that is configured to receive the magnetic field data sensed by the sensor 26. In one embodiment the sensor 26 locally stores the field strength data locally and the controller 44 periodically queries the sensor 26 for the data, for example, in a wireless fashion. Alternatively, the sensor 26 transmits the data to the controller 44, and such transmission may be performed, in one embodiment, in a wireless fashion.

Figure 3:
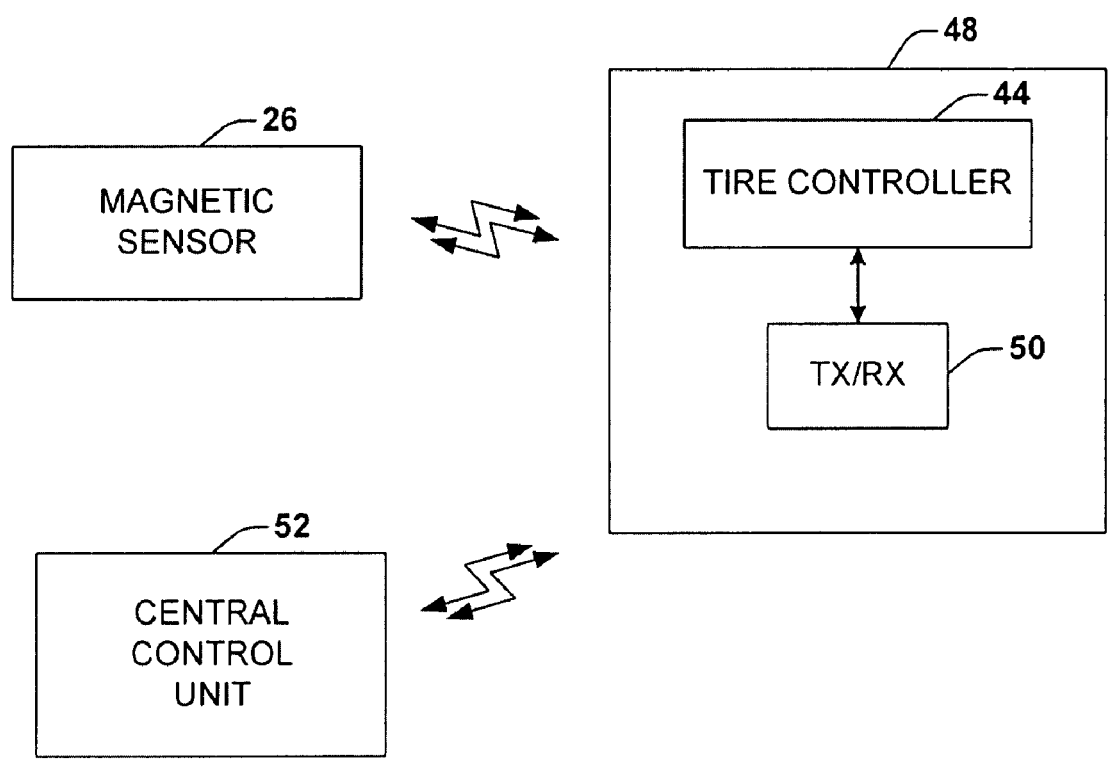
FIG. 3 is a cross section of a tire illustrating a tire tread sensing system having a plurality of magnetic field sensors according to one embodiment of the invention.

Turning now to FIG. 3, an embodiment of the invention is shown, wherein the magnetic field sensor 26 is wirelessly coupled to a tire module 48 that includes the tire controller 44 and a transceiver 50. In one embodiment the tire controller 44 queries the magnetic field sensor 26 at periodic, predetermined intervals, and stores such field strength data locally in a memory (not shown). While the communication shown in FIG. 3 is wireless, alternatively a hard wire arrangement could be employed. Further, in one embodiment, the tire controller 44 transmits such field strength data to the central control unit 52 via a wireless transmitter 50 associated with the tire module 48. In one embodiment, the tire controller 44 sends the data along with a data word that identifies the tire at issue (e.g., the front right tire, or tire number 3). Alternatively, the tire controller 44 transmits the data to the central control unit in a predetermined time slot that is allocated for data associated with that particular tire. In other embodiments, alternative tire localization methods can be used.

In one embodiment the central control unit 52 performs the requisite processing on the magnetic field strength data to generate any necessary warnings or service indications to the driver. In an alternative embodiment, the tire controller 44 processes the field strength data locally at the tire 12, and then transmits any necessary warning or service indication signal (s) to the central control unit 52 for subsequent communication to the driver.

In one embodiment the controller (44 or 52) compares the magnetic field strength ($B_T=B_1+B_2$) to a predetermined threshold. If $B_T$ is less than the threshold, then a significant amount of tire wear has occurred, causing $B_2$ to decrease substantially, thereby reducing the tire tread depth below a predetermined level. In one embodiment, the threshold comprises a fixed value, while in another embodiment, assuming a fixed $B_1$, $B_2$ is deduced from an initial $B_T$ reading, a threshold is then determined as a function of a predetermined percentage reduction in $B_2$. In another embodiment, the controller (44 or 52) may alter such threshold based on data provided relating to the type of tire being monitored.

In another embodiment, two sensors that are collectively positioned asymmetrically with respect to a tire tread groove 31 generate a differential signal therebetween indicative of an amount of tire tread wear, and the differential signal magnitude or quantity associated therewith is compared to a threshold. All such variations are contemplated as falling within the scope of the present invention.

While a few examples are provided above to reflect what type of processing may be employed, any form of data processing may be utilized and all such alternatives are contemplated by the invention.

Figure 4:
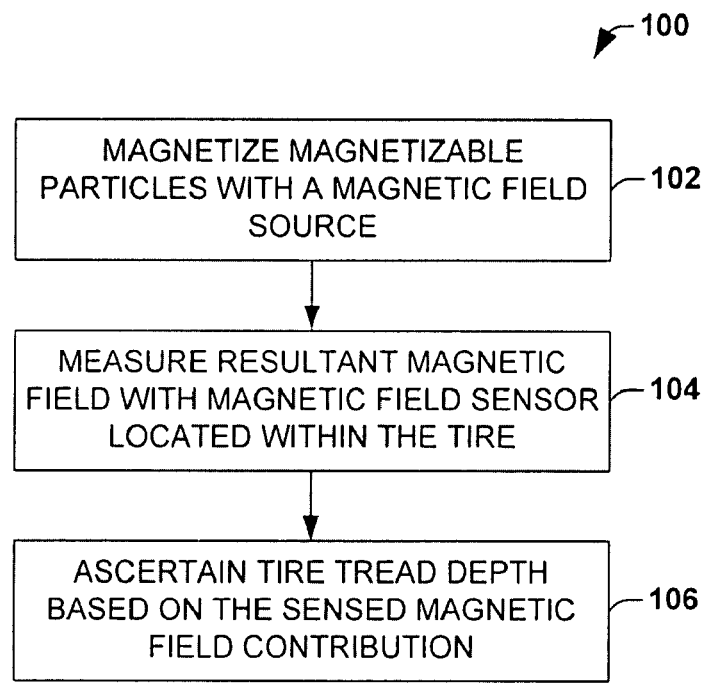
FIG. 4 is a block diagram illustrating communication of magnetic field data associated with a tire to a local controller and/or a remote central controller according to one embodiment of the invention.

Turning now to FIG. 4, a method of measuring tire tread depth on a moving vehicle is provided, as illustrated at reference numeral 100. While the method 100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Further, one or more of the acts depicted herein may be carried out in one or more separate acts and/or phases.

At 102 magnetizable particles embedded in a portion of a tire tread are magnetized with a magnetic field source. In one embodiment the particles comprise ferroelectric particles and the magnetic field source is a permanent magnet located within the tire. One advantage of a local permanent magnet within the tire as opposed to an external magnet brought briefly into close physical proximity with the particles is that the particles stay magnetized over time, and thus help maintain better accuracy in the subsequent conclusions drawn therefrom.

At 104 the resultant magnetic field is measured with a magnetic field sensor within the tire. Having the sensor within the tire advantageously allows tire tread depth data to be determined while the vehicle is moving. As the tire tread wears, the number of remaining magnetized particles therein decreases, and the measured magnetic field decreases. Using the sensed magnetic field data, the tire tread depth is determined at 106. In one embodiment, such a determination may simply be whether or not the tire tread is sufficiently worn to require maintenance or replacement. Alternatively, such a determination may be more sophisticated and involve a calculated percentage of wear, and use of historical data to extrapolate an estimate of when the tire may require maintenance or replacement.

Figure 5:
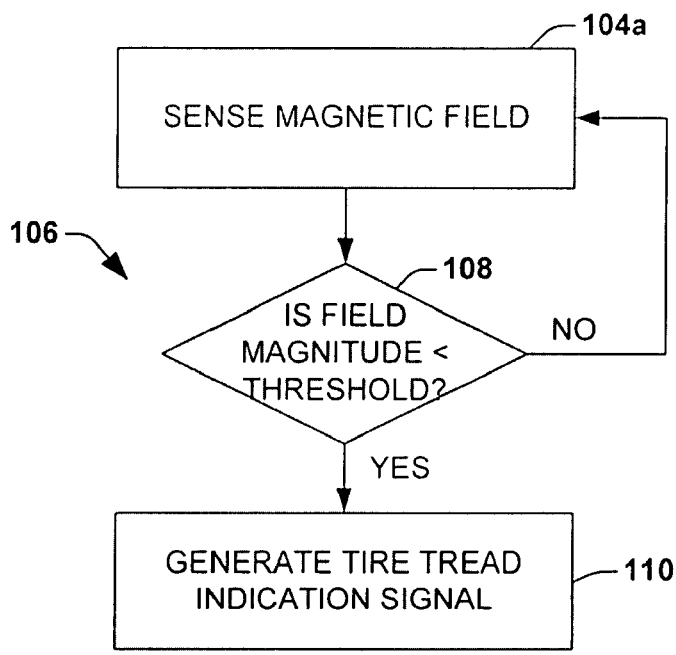
FIG. 5 is a flow chart diagram illustrating a method of determining a tire tread depth according to an embodiment of the invention.

One example embodiment of a portion of the above method is shown in FIG. 5, wherein a magnetic field associated with a moving tire is measured or otherwise sensed at 104a. One example of ascertaining the tire tread depth 106 includes comparing the sensed magnetic field magnitude to a predetermined threshold at 108. Alternatively, a differential signal associated with two sensors positioned asymmetrically with respect to a tire tread groove can be employed, and compared to a predetermined threshold at 108. If the field magnitude is greater than the threshold (NO at 108), then a sufficient number of particles reside within the tire to allow one to conclude that the tread has not been inordinately worn down. Alternatively, if the magnetic field magnitude has fallen below the threshold (YES at 108), then a tire tread indication signal is generated at 110. In one example, such an indication is provided in the car interior on the dashboard, thereby providing a driver an indication that the tire tread has worn to a point that replacement of the tire is warranted.

In another embodiment of the inventive method 100, the measuring of the magnetic field at 104 may be performed at a plurality of different locations about a transverse cross section of the tread portion of the tire. In one example, the measuring at 104 is performed using a plurality of magnetic field sensors located at different positions within the inside of the tire. At 106 the multiple pieces of data may then be used to ascertain one or more of tire tread depth or uneven tire tread wear across the transverse portion of the tire. Such uneven wear may the be indicative of a need for alignment or indicative of time to rotate the tire, etc.

Figure 6:
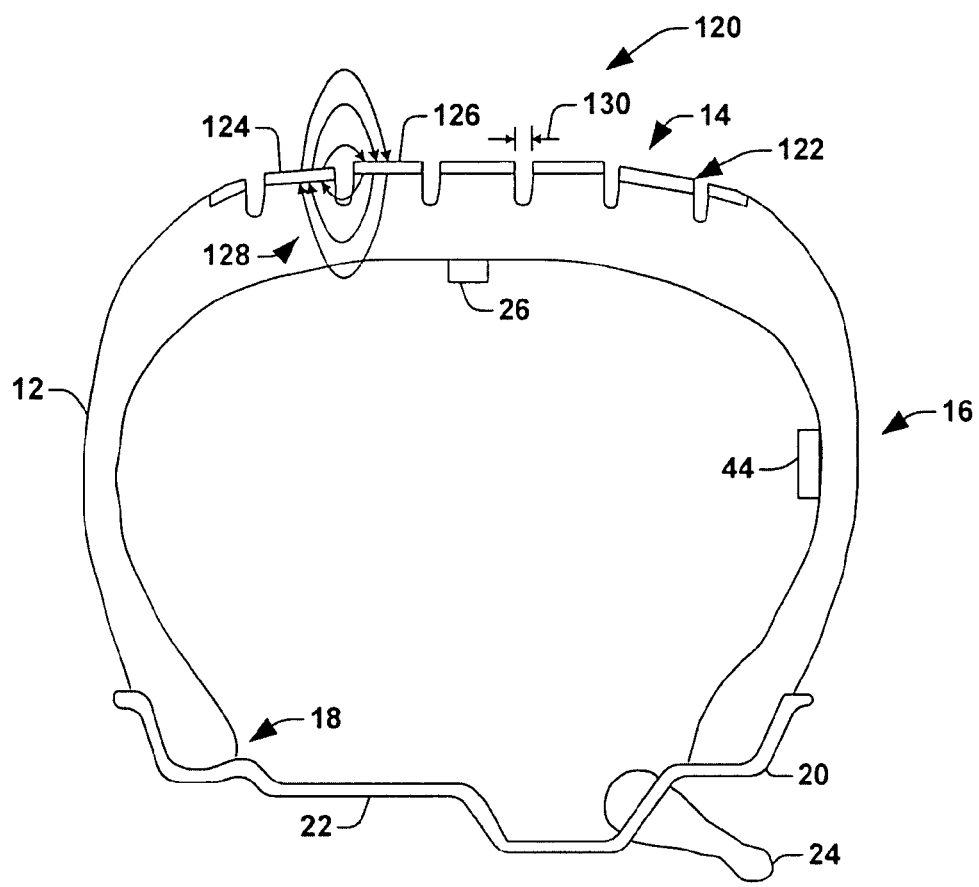
FIG. 6 is a flow chart diagram illustrating one example of determining tire tread depth according to an embodiment of the invention.
Figure 7:
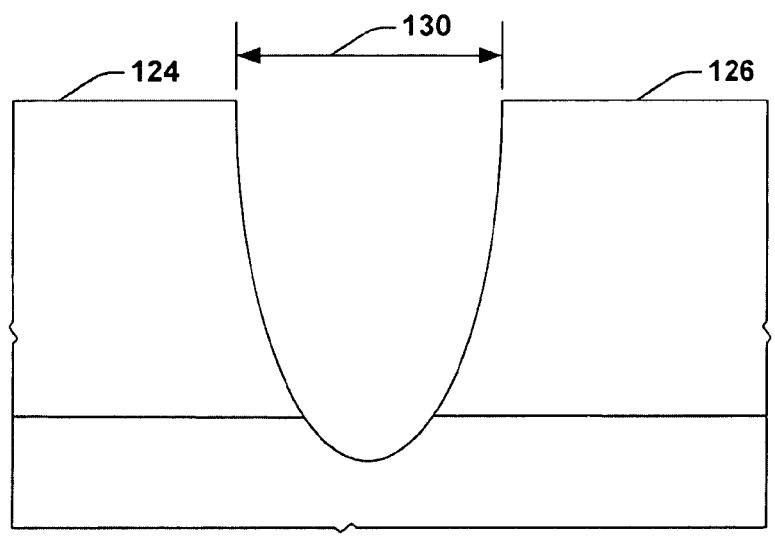
FIG. 7 is a cross section of a tire illustrating a tire tread sensing system according to another embodiment of the invention.

Turning now to FIG. 6, a tire tread sensing system 120 according to another embodiment is provided. The system 120 includes a plurality of permanent magnets 122 embedded in the tread portion 14 of the tire 12. The plurality of permanent magnets 122 are oriented in such a manner that a north pole 124 and a south pole 126 thereof face an outer surface of the tire in an alternating fashion. Therefore a first magnet has its north pole 124 facing outwards, and its south pole 126 facing inwards toward the tire center, while the neighboring magnets have their south poles 126 facing outwards, while their north poles 124 face inwards. Such an orientation causes magnetic fields illustrated by magnetic field lines 128 to form above and below the magnets, as illustrated. As can be appreciated, as the tire experiences wear, the magnitude of the magnetic field sensed by the sensor 26 decreases. In addition, as illustrated in FIG. 7, the tread 14 acts as a gap between the poles of the separated permanent magnets 124, 126. As can be appreciated, the gap distance 130 will change dynamically as the tire 12 rotates, causing a periodic fluctuation in the magnetic field that is a function of the tire speed. The periodic change in the sensed magnetic field may also be indicative of other physical tire characteristics such as tire wear, load, tire pressure, shear forces, traction, etc.

In one embodiment of the invention, the tire controller 44 continuously receives magnetic field data from the sensor 26, and such data is then used to draw conclusions regarding the status of the tire 12. The tire controller 44 or the central control unit 52 may then use the time varying data to generate status or repair indications, or even to activate a driver assistance system to take over control of the vehicle if a dangerous tire condition is detected.

Figure 8:
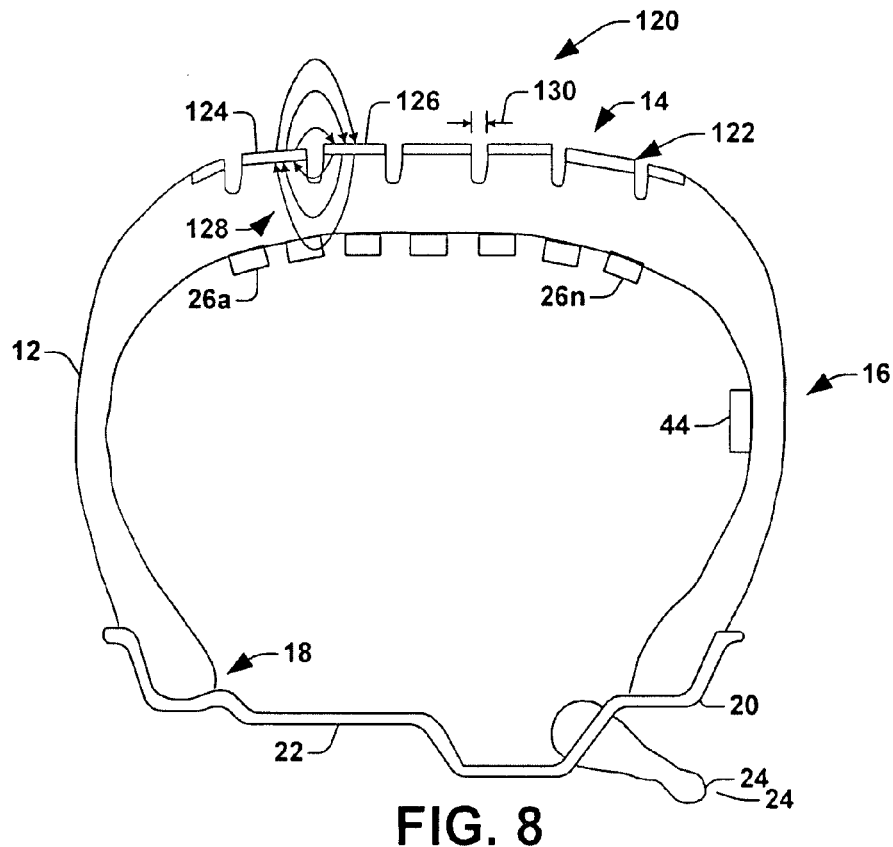
FIG. 8 is a fragmentary cross section diagram of a tire illustrating permanent magnets in a tread portion of a tire, and a gap associated therewith.

In another embodiment of the invention, the magnetic field sensor 26 comprises a plurality of sensors 26a-26n positioned transversely across the tire 12, as illustrated in FIG. 8. In such an embodiment, each of the magnetic field sensors 26a-26n collect magnetic field strength information that is primarily influenced by the amount of permanent magnetic material in the tire tread local thereto. In the above manner, the sensors 26a-26n collectively sense a magnetic field strength as a function of a transverse cross section of the tire 12. This information may then be employed to ascertain whether any tire wear is uneven, and in some instances be utilized to determine when tires should be rotated, for example.

In the above embodiment, each piece of magnetic field strength data is collected at the tire controller 44, and further processing can be employed there or at a vehicle central control unit to determine whether a tire tread is sufficiently low to generate a service notification, or whether tire wear is sufficiently uneven to trigger a tire rotation notification.

Figure 9:
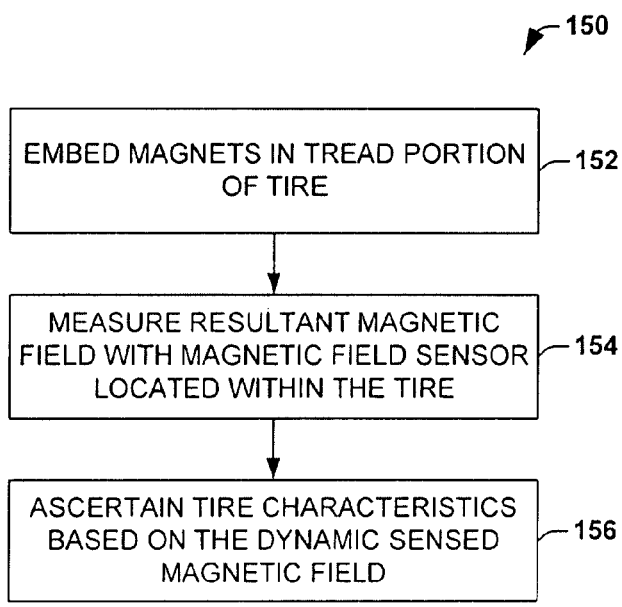
FIG. 9 is a flow chart diagram illustrating a method of detecting one or more tire characteristics based on a sensed magnetic field strength or a time-varying magnetic field according to another embodiment of the invention.

In still another embodiment of the invention, a method of detecting tire characteristics is provided in FIG. 9, at reference numeral 150. The method 150 comprises embedding permanent magnets into a tread portion of a tire at 152. In one embodiment, such magnets are oriented with their north/south poles in an alternating fashion as described supra. The resultant magnetic fields associated with the magnets are measured by a magnetic field sensor located within the tire at 154. In one embodiment, the magnetic field is measured with one sensor, while in an alternative embodiment a plurality of magnetic field sensors is employed.

Still referring to FIG. 9, one or more tire characteristics are ascertained at 156 using the sensed magnetic field data. In one embodiment, a magnetic field magnitude is compared to one or more predetermined thresholds to determine a tire tread wear status. In instances where it is determined that tire wear has progressed beyond a safe or otherwise advisable level, a status condition is generated and provided to a driver, for example, via a controller.

In another embodiment act 156 may comprise evaluating time-varying magnetic field data as the vehicle is moving to ascertain one or more tire characteristics such as load, tire pressure, shear forces, traction, etc. For example, as the tire rotates and the tire portion having the magnets is touching the pavement, a change in the gap 130 of the various tire treads occur, thereby altering the magnetic field in a periodic manner. This gap change and resultant magnetic field change can be a function of the various tire characteristics enumerated above. By sensing changes in the time-varying magnetic field data over time, or observing deviations from what is expected for a "healthy" tire, tire conditions are identified, and appropriate indication or alarm signals are sent to the driver. In one embodiment, detection of an imminent danger condition may trigger activation of a driver assistance system to take over control of the vehicle.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A tire tread sensing system, comprising:
   a magnetic field source configured to magnetize magnetizable particles embedded in a tire tread, wherein the magnetic field source is not embedded in the tire tread; and
   a magnetic field sensor configured to measure a magnetic field strength associated with the magnetic field source and the magnetizable particles, wherein the magnetic field strength is indicative of a tire tread depth.

2. The tire tread sensing system of claim 1, further comprising a controller configured to receive the magnetic field strength from the magnetic field sensor and generate a tire tread depth signal in response thereto.

3. The tire tread sensing system of claim 2, wherein the sensor is located asymmetrically with respect to a tire tread location, and wherein the controller is further configured to ascertain a differential signal associated with the measured magnetic field strength and generate a signal in response thereto that is indicative of the tire tread depth.

4. The tire tread sensing system of claim 1, wherein the magnetic field source comprises a permanent magnet.

5. The tire tread sensing system of claim 1, wherein the magnetic field sensor comprises a plurality of magnetic field sensors configured to measure a magnetic field strength at a plurality of locations across a transverse cross section of a tire.

6. The tire tread system of claim 5, further comprising a controller configured to ascertain whether a tire tread wear is uneven across the transverse cross section of the tire based on the magnetic field strengths from the plurality of magnetic field sensors.

7. The tire tread sensing system of claim 1, further comprising a transmitter configured to transmit data associated with the magnetic field strength in a wireless fashion.

8. A tire tread sensing system, comprising:
   means for magnetizing magnetizable particles embedded in a tire tread, wherein the means for magnetizing is not embedded in the tire tread; and
   magnetic field sensing means for sensing a magnetic field contribution of the magnetizable particles embedded in the tire tread, wherein the magnetic field contribution is indicative of a tire tread depth.

9. The tire tread sensing system of claim 8, further comprising a control means operable to receive the magnetic field contribution and generate a tire tread depth signal in response thereto.

10. The tire tread sensing system of claim 9, wherein the magnetic field sensing means is located asymmetrically with respect to a tire tread location and generate a differential signal associated with the sensed magnetic field contribution, and wherein the control means is further operable to provide an indication of the tire tread depth based on the differential signal.

11. The tire tread sensing system of claim 8, wherein the magnetic field sensing means comprises a plurality of magnetic field sensors configured to measure a magnetic field strength at a plurality of locations across a transverse cross section of a tire.

12. The tire tread system of claim 11, wherein the control means is further operable to ascertain whether a tire tread wear is uneven based on the magnetic field strengths across the transverse cross section of the tire from the plurality of magnetic field sensors.

13. The tire tread sensing system of claim 8, further comprising a transmission means configured to transmit data associated with the magnetic field strength in a wireless fashion.

14. A method of measuring tire tread depth on a moving vehicle, comprising:
    sensing a magnetic field contribution associated with selectively magnetizable particles embedded in a tire tread; and
    ascertaining a tire tread depth based on the sensed magnetic field contribution.

15. The method of claim 14, wherein sensing the magnetic field contribution comprises:
    magnetizing the magnetizable particles with a magnetic field source; and
    measuring the resultant magnetic field with a magnetic field sensor.

16. The method of claim 14, wherein ascertaining the tire tread depth comprises:
    comparing the sensed magnetic field contribution with a predetermined nominal value; and
    determining the tire tread depth based on the comparison result.

17. The method of claim 14, further comprising communicating the sensed magnetic field contribution to a controller in a wireless fashion, wherein the controller ascertains the tire tread depth in response thereto.

18. A tire tread sensing system, comprising:
    a plurality of permanent magnets configured to be embedded in a tire tread;
    a magnetic field sensor configured to measure a magnetic field strength associated with the permanent magnets, wherein the magnetic field strength is indicative of a tire tread depth, and wherein the magnetic field sensor comprises a plurality of magnetic field sensors configured to measure a magnetic field strength at a plurality of locations across a transverse cross section of a tire; and
    a controller configured to ascertain whether a tire tread wear is uneven across the transverse cross section of the tire based on the magnetic field strengths from the plurality of magnetic field sensors.

19. The tire tread sensing system of claim 18, further comprising a transmitter configured to transmit data associated with the magnetic field strength in a wireless fashion.

* * * * *